United States Patent
Schlag

[19]

[11] Patent Number: 6,069,722
[45] Date of Patent: May 30, 2000

[54] TRANSMITTER FOR OPTICALLY TRANSMITTING ANALOG ELECTRIC SIGNALS, AND DIGITAL TRANSMISSION SYSTEM

[75] Inventor: Erwin Schlag, Vaihingen, Germany

[73] Assignee: Alcatel, Paris, France

[21] Appl. No.: 08/923,699

[22] Filed: Sep. 4, 1997

[30]     Foreign Application Priority Data

Sep. 5, 1996  [DE]  Germany .......................... 196 35 989

[51] Int. Cl.$^7$ ................................ H04B 10/04
[52] U.S. Cl. ......................... 359/181; 359/180; 359/158
[58] Field of Search .................................. 359/180, 181, 359/158

[56]             References Cited

U.S. PATENT DOCUMENTS

| | | | |
|---|---|---|---|
| 5,485,302 | 1/1996 | Braun et al. ............................. | 359/189 |
| 5,517,232 | 5/1996 | Heidemann et al. ....................... | 348/7 |
| 5,530,722 | 6/1996 | Dent ...................................... | 375/298 |
| 5,659,314 | 8/1997 | Tokura et al. ........................... | 341/143 |
| 5,768,315 | 6/1998 | Mittel et al. ............................ | 375/247 |

FOREIGN PATENT DOCUMENTS

| | | |
|---|---|---|
| 0573156 | 12/1993 | European Pat. Off. . |
| 2922418 | 12/1980 | Germany . |
| 3208308 | 9/1983 | Germany . |
| 3908314 | 10/1991 | Germany . |
| 19518508 | 2/1996 | Germany . |
| 4438942 | 5/1996 | Germany . |

OTHER PUBLICATIONS

"DIAMANT—Ein digitales optisches Fernsehverteilnetz", H. Zielinski et al, *Telekom Praxis*, Feb. 1993, pp. 38–45.

"A 1.28–GHZ Sigma–Delta Modulator for Video A/D Conversion", M. Erbar et al, *IEEE Transactions on Consumer Electronics*, vol. 42, No. 3, Aug. 1996, pp. 357–361.

Unger, H., "Optische Nachrichtentechnik", Elitera–Verlag, Berlin, 1976, pp. 118, 119.

*Primary Examiner*—Leslie Pascal
*Assistant Examiner*—Hanh Phan

[57]             ABSTRACT

In a digital optical transmission system, such as a passive optical distribution network, analog electric signals, e.g., video signals, are to be optically transmitted in such a way that they can be recovered in a receiver (BONT) in a simple manner. To accomplish this, the transmitter of the transmission system includes a delta-sigma modulator (MOD) and an electrical-to-optical transducer (EO). The delta-sigma modulator (MOD) digitizes the analog electric signals using the delta-sigma modulation method. The electrical-to-optical transducer (EO) then converts the digitized signals to optical signals, which are transmitted over optical fibers to a plurality of receivers (BONT). To recover the analog electric signals, each receiver (BONT) requires only one optical-to-electrical transducer (OE) and one passive electric filter (FIL). The filter (FIL) is a passive low-pass filter in one case and a passive bandpass filter in another. Appropriate selection of the sampling frequency for the delta-sigma modulation and utilization of image frequencies for transmission eliminate the need for frequency translators in the receivers (BONT).

8 Claims, 2 Drawing Sheets

TRANSMITTER FOR OPTICALLY TRANSMITTING ANALOG ELECTRIC SIGNALS, AND DIGITAL TRANSMISSION SYSTEM

BACKGROUND OF THE INVENTION

1. Technical Field

This invention relates to a transmitter for optically transmitting analog electric signals and to a digital transmission system.

2. Discussion of Related Art

The analog electric signals are, for example, television signals or video signals. An optical transmission system for the optical digital transmission of television signals is known from an article entitled "DIAMANT"—Ein digitales optisches Fernsehverteilnetz", telecom praxis 2/1993, pages 38 to 45. The television signals are converted from analog to digital form, generally by pulse code modulation, electrically multiplexed, and converted from electrical to optical form; an optical pulse commonly corresponds to an electric pulse, and thus to one bit. The optical digital television signals are transmitted through a passive optical transmission network consisting of optical fibers and optical splitters to a plurality of receivers. Each receiver contains an optical-to-electrical transducer and a digital-to-analog converter for recovering the analog electric signals. The number of multiplexed television signals is limited by the resolution and speed of the available digital-to-analog converters. Each digital-to-analog converter is an active device which needs to be controlled and synchronized.

In each receiver, the digital-to-analog conversion must be followed by a frequency translation in order to transfer the television signals from the intermediate-frequency band to the UHF band.

DISCLOSURE OF THE INVENTION

It is therefore an object of the invention to optically and digitally transmit analog electric signals in such a way that they can be recovered at the receiving end with a smaller amount of technical complexity.

According to a first aspect of the present invention, a transmitter for optically transmitting analog or quasi-analog electric signals over optical fibers, comprises a delta-sigma modulator for digitizing the analog or quasi-analog electric signals by the delta-sigma modulation method, and an electrical-to-optical transducer for converting the digitized signals to optical signals.

In further accord with the first aspect of the present invention, the transmitter is further characterized in that the analog electric signals are video signals, and that the transmitter serves to feed the optical signals into a passive optical distribution network.

According further to the first aspect of present invention, the delta-sigma modulator comprises a series combination of an integrator, an electric amplifier, and a clocked bistable device, wherein an output of the bistable device is fed back to the input of the integrator. The integrator may be a passive low-pass filter comprising resistors and capacitors, the bistable device may be a D flip-flop, and the inverting output of the D flip-flop may be connected to the input of the integrator.

According still further to the first aspect of the invention, the analog electric signals are quadrature-amplitude-modulated in a QAM modulator before being digitized.

According to a second aspect of the present invention, a digital optical transmission system comprises at least one transmitter according to the first aspect of the present invention, a passive optical transmission network, and two or more receivers, wherein each receiver comprises an optical-to-electrical transducer and a passive electric filter for recovering the analog or quasi-analog electric signals from the received optical signal.

In further accord with the second aspect of the invention, the at least one transmitter is a transmitter according to the first aspect of the present invention and, in the receivers, each passive filter is preceded by a clocked bistable device which is driven at the same clock frequency as the bistable device in the transmitter. The clock frequencies of the bistable devices are chosen so that the image frequencies of the output signals of the bistable devices in the receivers lie in a predetermined frequency range, wherein the filter attenuates signals whose frequencies lie below a predetermined frequency range, and wherein an amplifier amplifies signals passed by the filter to a predetermined value.

In still further accord with the second aspect of the present invention, each passive filter is a passive low-pass filter or a passive band pass filter.

A particular advantage of the invention is that only passive components are necessary for the digital-to-analog conversion in the receivers. As a result, the receivers are lower in cost, less susceptible to trouble, simpler in circuit design, and suitable for high frequencies.

Another advantage of the invention is that if a suitable sampling frequency is chosen for the delta-sigma modulation, no further frequency translation is necessary in the receivers. This provides an additional cost saving in the receivers, both during manufacture and during operation.

BRIEF DESCRIPTION OF THE DRAWING

The invention will become more apparent from the following description of an embodiment taken in conjunction with the accompanying drawings, in which.

DETAILED DESCRIPTION OF THE PREFERRED EMBODIMENTS

Figure 1:
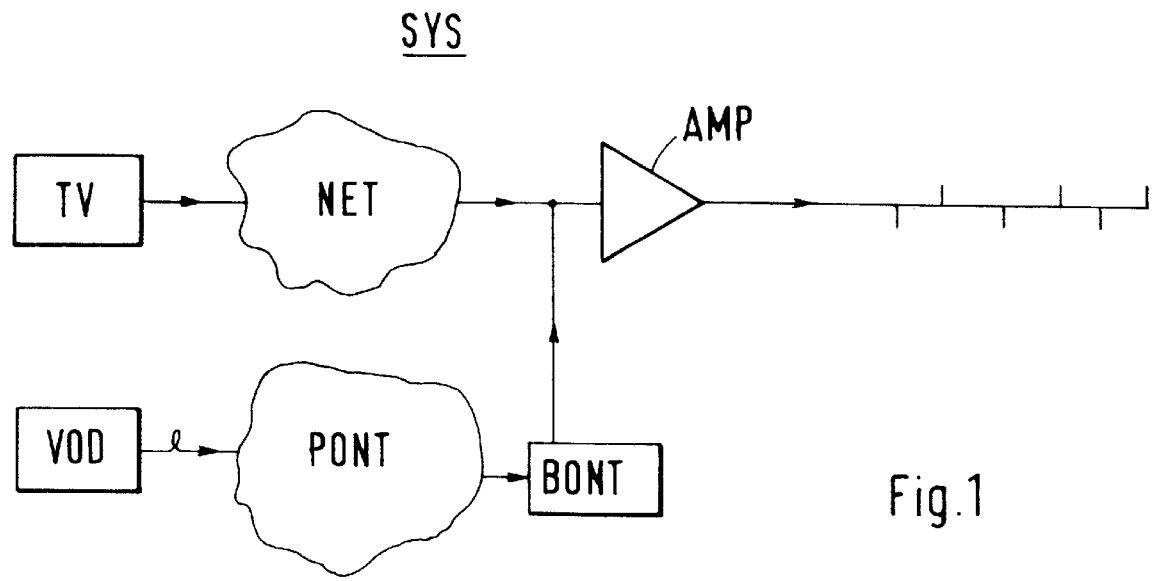
FIG. 1 is a schematic representation of a transmission system according to the invention.

The embodiment will first be explained with the aid of FIG. 1. FIG. 1 shows a transmission system according to the invention. The transmission system SYS includes a head end TV for the analog transmission of analog television signals over coaxial cables and a server VOD for the digital transmission of analog electric signals, particularly video signals, over optical fibers. The video signals are, for example, feature films, educational programs, tourist promotion films, or the like, which are selected by subscribers in an interactive mode. The selection of the video signals is made via a reverse channel (not shown), which is implemented via a telephone network, for example.

The analog television signals from the head end TV are transmitted over a distribution network NET consisting of coaxial cables and amplifiers to a plurality of terminal repeaters, of which only one is shown. From each terminal repeater AMP, several terminals are supplied via a coaxial cable.

In the server VOD the analog electric signals are digitized, then converted from electrical to optical form, and subsequently transmitted over a passive optical transmission network PONT consisting of optical fibers and optical splitters, preferably a distribution network with a tree structure, to several receivers, of which only one is shown. The receiver BONT is a broadband optical network termination, for example. It serves to recover the analog electric signals from the received optical signals. The receiver BONT is connected by a coaxial cable to the input of the terminal repeater AMP, so that the analog electric signals are transmitted together with the television signals to the terminals over the coaxial cable connected to the output of the terminal repeater AMP.

The analog electric signals are digitized in the server VOD by delta-sigma modulation, so that in each receiver BONT only one optical-to-electrical transducer and one passive low-pass filter or, if a suitable sampling frequency is chosen for the digitization, only one optical-to-electrical transducer and one passive bandpass filter are necessary to recover the analog electric signals.

Figure 2:
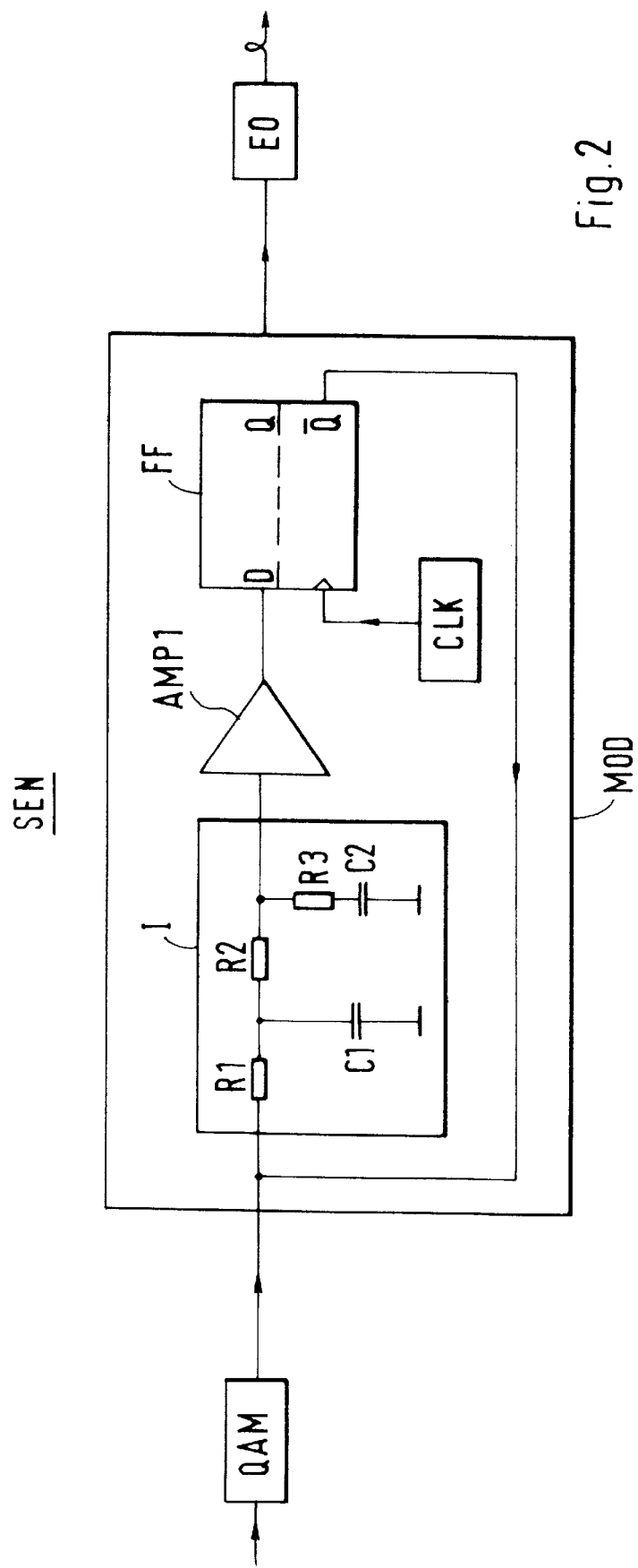
FIG. 2 is a block diagram of a transmitter according to the invention for the transmission system of FIG. 1.

The embodiment will now be further explained with the aid of FIG. 2. FIG. 2 shows a transmitter according to the invention for the server of the transmission system of FIG. 1. The transmitter SEN serves to optically and digitally transmit analog electric signals over optical fibers, e.g., glass fibers. It contains a delta-sigma modulator MOD for digitizing the analog electric signals by the delta-sigma modulation method and an electrical-to-optical transducer EO for converting the digitized signals to optical signals. The delta-sigma modulator MOD and the electrical-to-optical transducer EO are connected in series.

The electrical-to-optical transducer EO is, for example, a directly modulated laser diode or a laser with an external electrooptic modulator which is driven with the digitized analog electric signals.

The delta-sigma modulator MOD can, for example, contain a series combination of an integrator I, an electric amplifier AMP1 used as a comparator, and a clocked bistable device FF used as a 1-bit encoder. Such an integrator I is preferably implemented with a passive low-pass filter consisting of resistors and capacitors. The low-pass filter is, for example, a second-order low-pass filter consisting of a ladder network with two resistors R1, R2 in the series arms and a capacitor C1 in the first shunt arm and with a series combination of a resistor R3 and a capacitor C2 in the second shunt arm. The analog electric signals are accumulated, together with fed-back digital signals, in the integrator I, compared with a reference value in the comparator-connected amplifier AMP1, and then digitized in the bistable device FF.

The bistable device FF may be a D flip-flop. The D flip-flop has a signal input, a clock input, and two outputs, a noninverting one and an inverting one. The inverting output of the D flip-flop is connected to the input of the integrator I in order to perform the delta-sigma modulation function via this feedback. Particularly at high bit rates, e.g., bit rates greater than 300 MHz, propagation delays in the feedback loop adversely affect the modulator properties. The processing of one bit must be completed within one bit period, so the propagation delays in the feedback loop may be only a fraction of one bit period. It is therefore advantageous to use a monolithic integrated implementation for the comparator and the D flip-flop. The D flip-flop is driven by the clock signal from a free-running oscillator CLK. The clock frequency of the oscillator CLK is adjustable and represents the sampling frequency of the delta-sigma modulation.

The properties of the delta-sigma modulator MOD are dependent on the value of the sampling frequency. The quantization signal-to-noise ratio, an important property of the delta-sigma modulator MOD, can be adapted via the sampling frequency. The sampling frequency for the delta-sigma modulator MOD is determined by the frequency and the required quality of the analog signals to be transmitted. The clock frequency is well above the Nyquist frequency of the analog electric input signals in order to provide the necessary tansmission quality for the delta-sigma modulation. The delta-sigma modulator is preceded by a QAM modulator QAM, which modulates the video signals by the quadrature amplitude modulation method. With 64 QAM modulation, for example, quasi-analog output signals with a bandwidth of 8 MHz are generated, which require a signal-to-noise ratio of 25 dB for transmission. Within the bandwidth of 8 MHz, up to 38 Mb/s video signals can thus be transmitted. A comparable transmission of an analog television signal would require a signal-to-noise ratio of at least 45 dB. The use of QAM modulation reduces the requirements placed on the delta-sigma modulator in terms of signal-to-noise ratio.

Accordingly, the sampling rate can be reduced, which results in a lower transmission rate on the digital optical link. For example, four QAM signals each having a bandwidth of 8 MHz which are arranged in the frequency range of 8 MHz to 40 MHz can be converted from analog to digital form by the delta-sigma modulator at a clock frequency of 400 MHz, which is sufficient for this signal frequency and transmission quality.

In the following, two type of transmission of the digitized analog signals and their recovery are described.

1) The quantization signal-to-noise ratio of the delta-sigma modulator MOD can also be influenced via the property of the integrator I. The sampling function of the delta-sigma modulator causes quantization noise components which are scattered over a wide frequency range. With the implementation of the integrator I, e.g., first-order or second-order low-pass filters, these quantization noise components are shifted out of the frequency range of the wanted signal toward higher frequency ranges. Such an integrator I is therefore also referred to as a noise-forming filter. The digital output signals of the delta-sigma modulator MOD contain both the spectral frequency components of the wanted analog signal and the unwanted quantization noise components. After the electrical-to-optical conversion, the digital optical signals are transmitted over a glass fiber cable and, if necessary, optical splitters to a plurality of receivers. In the receiver BONT the digital optical received signal is converted from optical to electrical form. The wanted analog electric signal is recovered from the now digital electric signal by means of a filter FIL, e.g., a low-pass filter, which filters out the wanted signals and discriminates strongly against the unwanted spectral quantization noise components above the wanted signal frequency range. An additional postfilter for suppressing unwanted image-frequency components can be dispensed with, since, as a result of the high oversampling, these components lie far above the wanted frequency range, so that they are sufficiently attenuated already in the low-pass filter. Thus, the entire digital-to-analog converter function is implemented in the low-pass filter, which is preferably constructed from passive components and has low power consumption. In the receiver BONT, the recovered analog signals must be transferred to the predetermined UHF band by an IF/UHF translator, since their transmission on the coaxial cable connected to the output of the terminal amplifier AMP takes place in the UHF band of, e.g., 400 MHz to 450 MHz. The analog television signals from the head end are transmitted in the 50–400 MHz band, for example. With a combiner, the recovered analog video signals are nonoverlappingly combined with the analog television signals using frequency-division multiplexing. The combiner output signal is amplified with the terminal amplifier and transmitted over coaxial cables to the terminals.

2) If a suitable sampling frequency is chosen for the delta-sigma modulator MOD, image frequencies are produced in the spectrum of the digital signal, which fall into the frequency range of, e.g., 400 MHz to 450 MHz. This frequency range is intended for the transmission of the analog video signals recovered in the receiver BONT over the coaxial cable connected to the output of the receiver. In that case, the filter FIL in the receiver BONT must be implemented as a bandpass filter which passes only signals in the UHF range of 400 MHZ to 450 MHZ. The video signals recovered from the image frequencies and filtered by the bandpass filter have a small amplitude. They are therefore amplified to a predetermined value in a subsequent amplifier AMP2. An IF/UHF translator is no longer needed, since the analog signals are already present in the required UHF range. To recover the analog signals, each receiver BONT contains an optical-to-electrical transducer, the bandpass filter FIL, which passes only signals in the 400–450 MHz range, and the amplifier AMP2.

Figure 3:
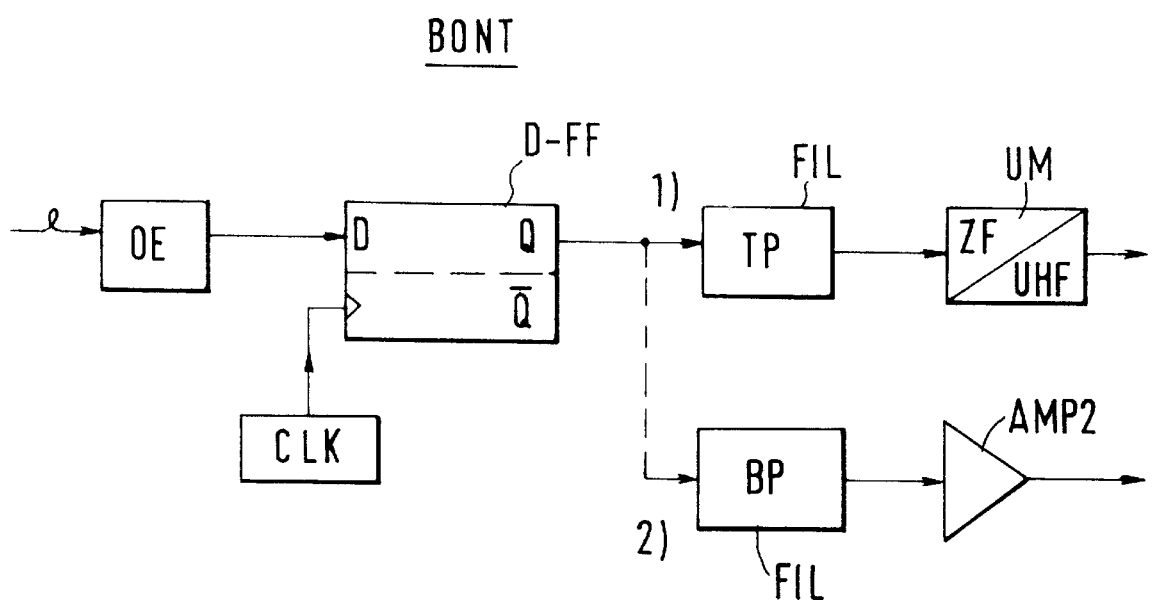
FIG. 3 is a schematic diagram of a receiver according to the invention for the transmission system of FIG. 1.

The embodiment will now be further explained with the aid of FIG. 3. FIG. 3 shows a receiver according to the invention for the transmission system of FIG. 1. The receiver BONT contains an optical-to-electrical transducer OE, a bistable device D-FF, a passive electric filter for recovering the analog electric signals, and, if required, a UHF translator UM. The optical-to-electrical transducer OE is implemented, for example, with a photodiode followed by an amplifier, which converts the received digital optical signals to digital electric signals. The clocked bistable device D-FF, which is connected between the optical-to-electrical transducer OE and the passive electric filter FIL, serves to regenerate the digital electric input signals. The clocked bistable device D-FF is a D flip-flop, for example, whose clock frequency is derived from the received digital signal in a clock recovery ciruit. The clock frequency is identical with the sampling frequency of the delta-sigma modulator MOD in the transmitter SEN. The regenerated digital signals are fed to the passive electric filter FIL, which converts them back to analog electric signals. For the case of the transmission described under 1) above, the electric filter FIL is a passive low-pass filter followed by the IF/UHF translator UM. The IF/UHF translator UM shifts these analog electric signals from the IF band to the required UHF band of 400 MHz to 450 MHz. For the case of the transmission described under 2) above, the electric filter FIL is a passive bandpass filter followed by an amplifier AMP2.

Prior to the digitization, the analog electric signals may be digitized and digitally stored in the server using the MPEG (Motion Picture Experts Group) method. When parts of the stored signals are retrieved by request signals from subscribers, several retrieved digitized signals are combined and then quadrature-amplitude-modulated. The resulting quasi-analog signals are digitized in the delta-sigma modulator MOD. Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A transmitter (SEN) for optically transmitting analog or quasi-analog electric signals over optical fibers, comprising:

a delta-sigma modulator (MOD) for digitizing the analog or quasi-analog electric signals by a delta-sigma modulation method; and an electrical-to-optical transducer (EO) for converting the digitized signals to optical signals wherein the delta-sigma modulator (MOD) comprises a series combination of an integrator (I), an electric amplifier (AMP1), and a clocked bistable device (FF), wherein an output of the bistable device (FF) is fed back to an input of the integrator, wherein the integrator (I) is a passive low-pass filter comprising resistors and capacitors, wherein the bistable device (FF) is a D flip-flop, and wherein an inverting output of the D flip-flop is connected to an input of the integrator (I).

2. A transmitter (SEN) as claimed in claim 1, wherein the analog electric signals are video signals, and wherein the transmitter (SEN) serves to feed the optical signals into a passive optical distribution network.

3. A transmitter (SEN) as claimed in claim 1, wherein the analog electric signals are quadrature-amplitude-modulated in a QAM modulator (QAM) before being digitized.

4. A digital optical transmission system (SYS) comprising at least one transmitter (SEN) as claimed in claim 1, a passive optical transmission network (PONT), and two or more receiver s (BONT), wherein each receiver (BONT) comprises an optical-to-electrical transducer (OE) and a passive electric filter (FIL) for recovering the analog or quasi-analog electric signals from the received optical signals.

5. A digital optical transmission system (SYS) as claimed in claim 4, wherein the receivers (BONT), each passive filter (FIL) is preceded by a clocked bistable device (D-FF) which is driven at the same clock frequency as the bistable device (FF) in the transmitter (SEN).

6. A digital optical transmission system (SYS) as claimed in claim 5, wherein each passive filter (FIL) is a passive low-pass filter or a passive bandpass filter.

7. A digital optical transmission system (SYS) as claimed in claim 5, wherein the clock frequencies of the bistable devices (D-FF, FF) are chosen so that the image frequencies of the output signals of the bistable devices (D-FF) in the receivers (BONT) lie in a predetermined frequency range, wherein the filter (FIL) attenuates signals whose frequencies lie below the predetermined frequency range, and wherein an amplifier (AMP2) amplifies signals passed by the filter (FIL) to a predetermined value.

8. A digital optical transmission system (SYS) as claimed in claim 4, wherein each passive filter (FIL) is a passive low-pass filter or a passive bandpass filter.

* * * * *

UNITED STATES PATENT AND TRADEMARK OFFICE
CERTIFICATE OF CORRECTION

PATENT NO : 6,069,722
DATED : May 30, 2000
INVENTOR(S): E. Schlag

It is certified that error appears in the above-identified patent and that said Letters Patent are hereby corrected as shown below:

At INID [56], "References Cited", prior to line 3, please insert:

--5,245,345    9/1993    Greenwood et al    341/143--.

Signed and Sealed this

Twenty-fourth Day of April, 2001

Attest:

NICHOLAS P. GODICI

Attesting Officer

Acting Director of the United States Patent and Trademark Office